US012566670B2

(12) United States Patent
Bhatia et al.

(10) Patent No.: US 12,566,670 B2
(45) Date of Patent: Mar. 3, 2026

(54) SUPPORTING AUTOMATIC AND FAILSAFE BOOTING OF BMC AND BIOS FIRMWARE IN A CRITICAL SECURED SERVER SYSTEM

(71) Applicant: American Megatrends International, LLC, Duluth, GA (US)

(72) Inventors: Anurag Bhatia, Sugar Hill, GA (US); Winston Thangapandian, Suwanee, GA (US); Valantina Arumugam, Chennai (IN); Sathiyaseelan Lakshminarayanan, Thiruvarur (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 72 days.

(21) Appl. No.: 18/086,937

(22) Filed: Dec. 22, 2022

(65) Prior Publication Data

US 2024/0211350 A1    Jun. 27, 2024

(51) Int. Cl.
*G06F 11/14* (2026.01)
*G06F 9/4401* (2018.01)

(52) U.S. Cl.
CPC ........ *G06F 11/1417* (2013.01); *G06F 9/4406* (2013.01)

(58) Field of Classification Search
CPC .......................... G06F 11/1417; G06F 9/4406
See application file for complete search history.

(56) References Cited

U.S. PATENT DOCUMENTS

| | | | |
|---|---|---|---|
| 11,003,780 B2 | 5/2021 | Liu et al. | |
| 11,609,997 B2 * | 3/2023 | Tsai | G06F 21/44 |

| | | | | |
|---|---|---|---|---|
| 2013/0173952 A1* | 7/2013 | Gao | | G06F 9/4406 |
| | | | | 714/E11.112 |
| 2016/0328300 A1* | 11/2016 | Rahardjo | | G06F 11/1417 |
| 2017/0322816 A1* | 11/2017 | Parthiban | | G06F 9/4416 |
| 2020/0042710 A1* | 2/2020 | Liu | | G06F 21/575 |

(Continued)

FOREIGN PATENT DOCUMENTS

| | | | | | |
|---|---|---|---|---|---|
| CN | 107423626 A | * | 12/2017 | | G06F 21/572 |
| CN | 113505380 A | * | 10/2021 | | G06F 21/602 |

OTHER PUBLICATIONS

Fortra. (Oct. 5, 2015). What is public key cryptography?. What is Public Key Cryptography (PKC)? | Digital Guardian. https://www.digitalguardian.com/resources/knowledge-base/what-public-key-cryptography (Year: 2015).*

(Continued)

*Primary Examiner* — Ashish Thomas
*Assistant Examiner* — Kayo Lisa Rusin
(74) *Attorney, Agent, or Firm* — Tim Tingkang Xia, Esq.; TROUTMAN PEPPPER LOCKE LLP

(57) ABSTRACT

In an aspect of the disclosure, a method, a computer-readable medium, and an apparatus are provided. The apparatus is a BMC. The BMC validates a first boot program from an active firmware image based on a hardware component of the BMC. The BMC validates a first boot program from a recovery firmware image based on the hardware component, when the first boot program of the active firmware image is not validated. The BMC executes the first boot program from the recovery firmware image, when the first boot program from the recovery firmware image is validated.

18 Claims, 5 Drawing Sheets

(56) References Cited

U.S. PATENT DOCUMENTS

| | | | |
|---|---|---|---|
| 2020/0104211 A1* | 4/2020 | Obayashi | G06F 11/1417 |
| 2020/0257518 A1* | 8/2020 | Liedtke | G06F 8/65 |
| 2021/0157921 A1* | 5/2021 | Brown | G06F 21/575 |
| 2021/0365323 A1* | 11/2021 | Yu | G06F 11/1417 |

OTHER PUBLICATIONS

CN-107423626, translated by PE2E on Jun. 4, 2025 (Year: 2025).*
CN-113505380, translated by PE2E on Jun. 4, 2025 (Year: 2025).*

\* cited by examiner

300

106, 106'

| |
|---|
| S-Boot <u>312</u> |
| U-Boot <u>314</u> |
| NVRAM <u>316</u> |
| Kernel <u>318</u> |
| Rootfs <u>320</u> |
| Applications <u>322</u> |
| ●●● |
| Platform Specific Data <u>324</u> |

400

SUPPORTING AUTOMATIC AND FAILSAFE BOOTING OF BMC AND BIOS FIRMWARE IN A CRITICAL SECURED SERVER SYSTEM

BACKGROUND

Field

The present disclosure relates generally to computer systems, and more particularly, to techniques of validating firmware image based on hardware root of trust (HROT) during a booting process at a baseboard management controller (BMC).

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

Not all host systems have the hardware capability for service processors to access storages of component devices (e.g., a Serial Peripheral Interface (SPI) storages) directly or communicate with the component devices. Therefore, there is a need for a mechanism for updating firmware of the component devices conveniently.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is a BMC. The BMC validates a first boot program from an active firmware image based on a hardware component of the BMC. The BMC validates a first boot program from a recovery firmware image based on the hardware component, when the first boot program of the active firmware image is not validated. The BMC executes the first boot program from the recovery firmware image, when the first boot program from the recovery firmware image is validated.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
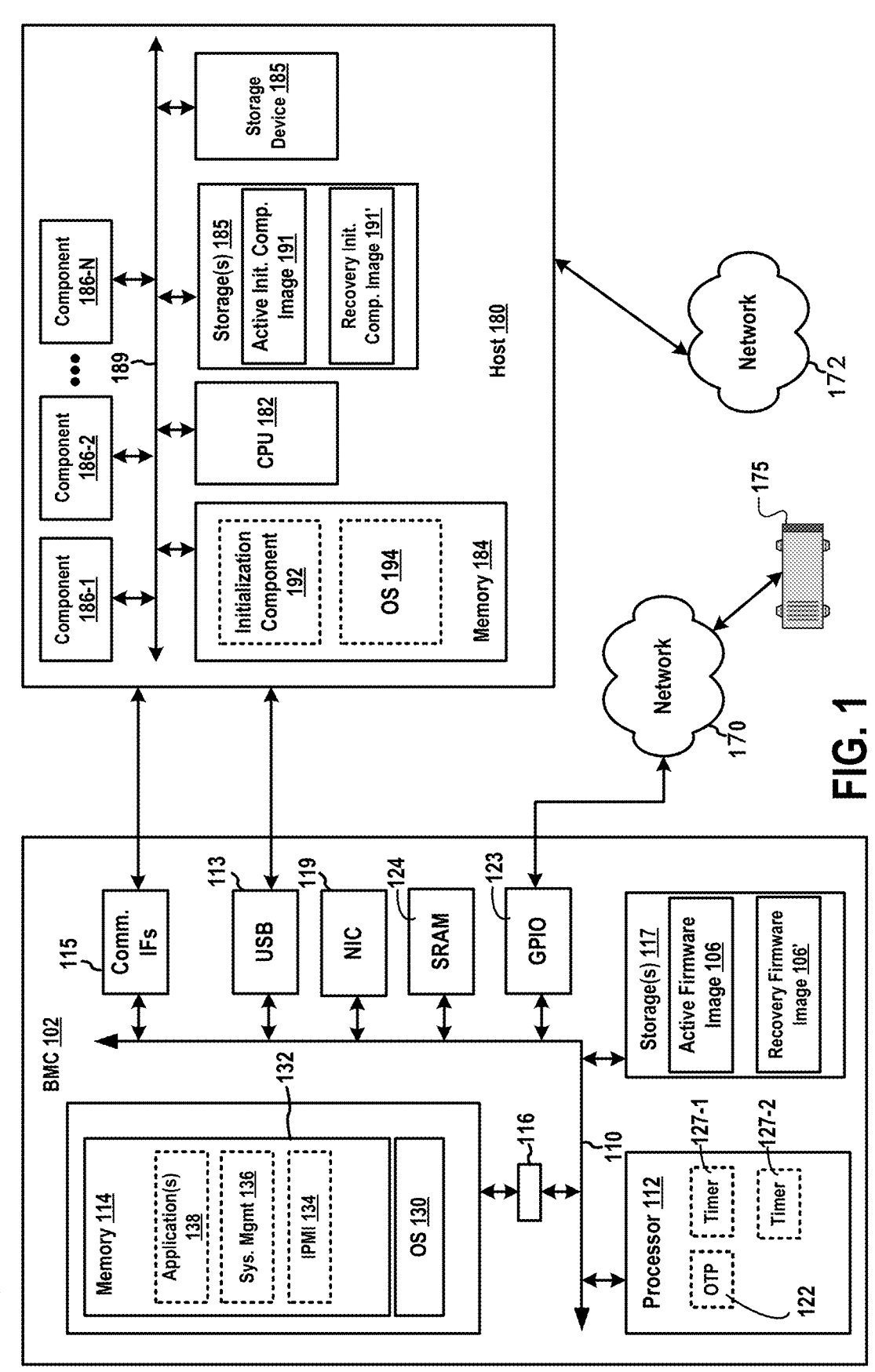
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a processing unit 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface). Further, the processing unit 112 contains an OTP memory 122 (i.e., one time programmable memory). The processing unit 112 also may contain one or more hardware timers such as a timer 127-1 and a timer 127-2. The functionalities of the timers 127-1, 127-2 are provided by the hardware components of the processing unit 112, rather than based on software programming.

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage(s) 117, the network interface card 119, the USB interface 113, and/or the communication interfaces 115 may be on the same chip. In addition, the memory 114, the processing unit 112, the memory driver 116, the storage(s) 117, the communication interfaces 115, and/or the network interface card 119 may be in communication with each other through a communication channel 110 such as a bus architecture.

The BMC 102 may store active BMC firmware image 106 in the storage(s) 117. The storage(s) 117 may utilize one or more non-volatile, non-transitory storage media. During a boot-up, the processing unit 112 loads code and data of the active BMC firmware image 106 into the memory 114. In particular, the active BMC firmware image 106 can provide in the memory 114 an BMC OS 130 (i.e., operating system) and service components 132. The service components 132 include, among other components, IPMI services 134, a system management component 136, and application(s) 138. Further, the service components 132 may be implemented as a service stack. As such, the active BMC firmware image 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 502 shown in FIG. 5.

After the host computer 180 is powered on, the host CPU 182 loads an initialization component 192 from the storage device(s) 185 into the host memory 184 and executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s)

185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Figure 2:
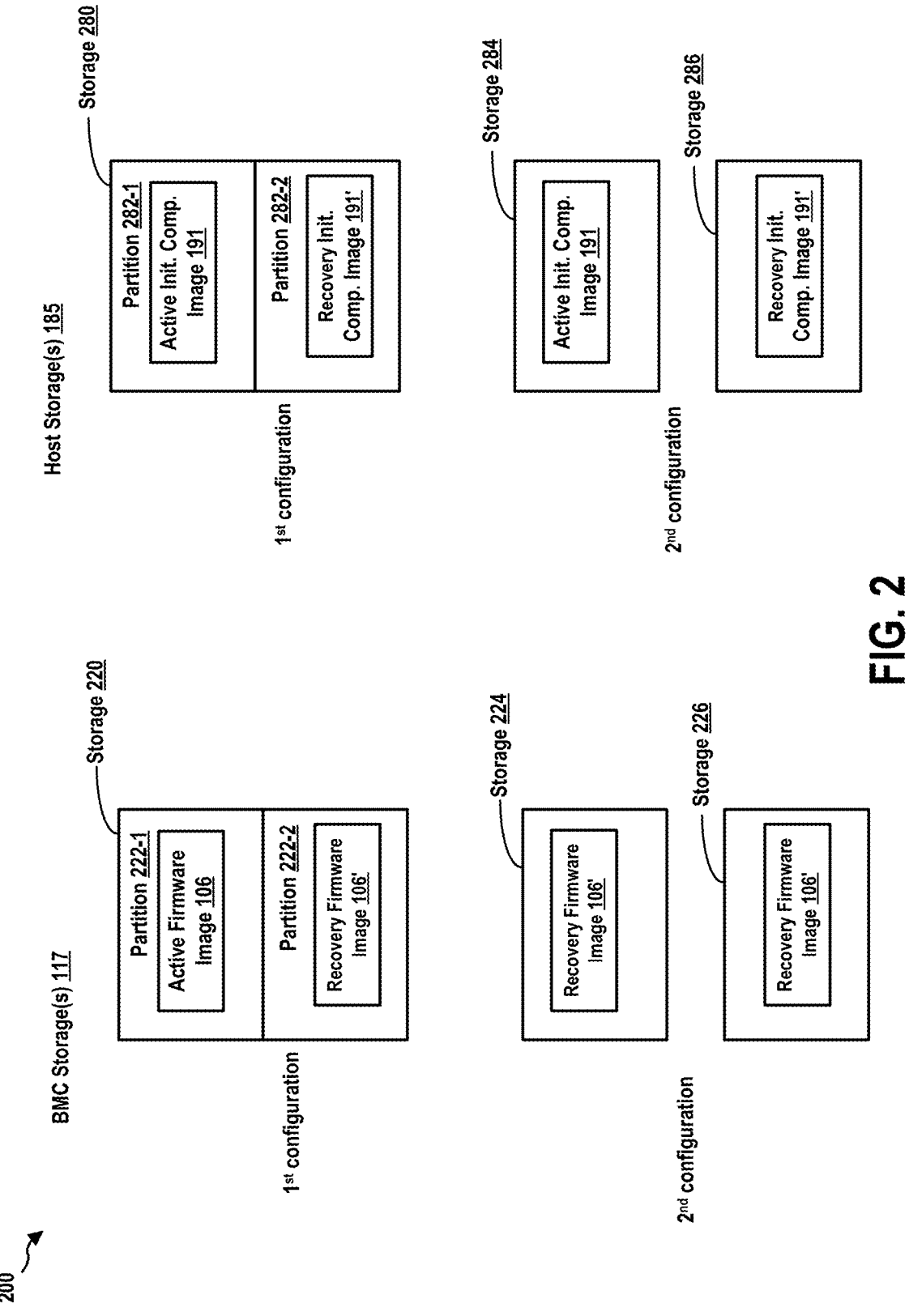
FIG. 2 is a diagram illustrating configurations of storage devices at a BMC and a host computer.

FIG. 2 is a diagram 200 illustrating configurations of storage devices at the BMC 102 and the host computer 180. In a first configuration of the BMC 102, the active BMC firmware image 106 and the recovery BMC firmware 106' are stored in a single storage device 220 (e.g., a serial peripheral interface (SPI) flash storage) of the storage(s) 117. For example, the storage device 220 may have a partition 222-1, which stores the active BMC firmware image 106, and a partition 222-2, which stores the recovery BMC firmware 106'. In a second configuration, the storage(s) 117 includes two separate storage devices (e.g., SPI flash storage): a storage device 224, which stores the active BMC firmware image 106, and a storage device 226, which stores the recovery BMC firmware 106'.

Similarly, in a first configuration of the host computer 180, the active initialization component image 191 and the recovery initialization component image 191' are stored in a single storage device 280 (e.g., a SPI flash storage) of the storage device(s) 185. For example, the storage device 280 may have a partition 282-1, which stores the active initialization component image 191, and a partition 282-2, which stores the recovery initialization component image 191'. In a second configuration, the storage device(s) 185 includes two separate storage devices (e.g., SPI flash storage): a storage device 284, which stores the active initialization component image 191, and a storage device 286, which stores the recovery initialization component image 191'.

Figure 3:
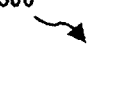
FIG. 3 is a diagram illustrating data sections of an active BMC firmware image or a recovery BMC firmware 106'.

FIG. 3 is a diagram 300 illustrating data sections of an active BMC firmware image 106 or a recovery BMC firmware 106'. Each of the active BMC firmware image 106 and the recovery BMC firmware 106' contains data sections of an S-Boot 312 (i.e., a first boot program), a U-Boot 314 (i.e., a second boot program), a NVRAM 316 (i.e., non-volatile random-access memory), a kernel 318, a rootfs 320 (i.e., root file system), applications 322, and platform specific data 324.

Figure 4:
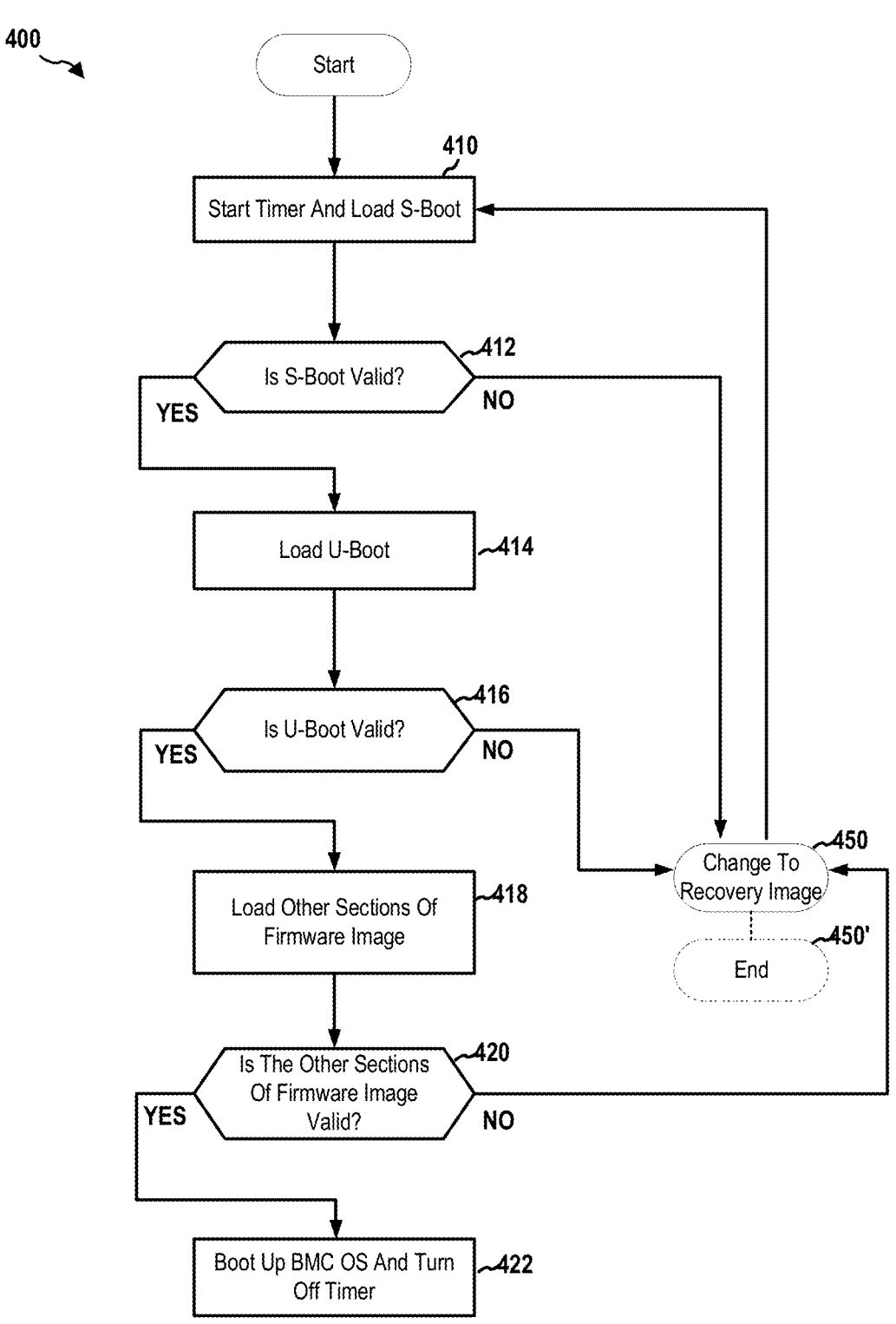
FIG. 4 is a diagram illustrating validation procedures utilized in a bootup process of the BMC.

FIG. 4 is a diagram 400 illustrating validation procedures utilized in a bootup process of the BMC 102. After the BMC 102 is powered on or reset, the BMC 102 enters a booting process.

In initially, the processing unit 112 use the active BMC firmware image 106 stored in the storage(s) 117 as an input and loads data sections in the procedures described infra. In procedure 410, the processing unit 112 configures the timer 127-1 to expire at a first time period and starts the timer 127-1. The first time period is longer than a time period needed to boot up the BMC 102. For example, assuming the booting process needs 30 seconds to complete, the first time period may be 45 seconds. Further, the processing unit 112 loads, from the storage(s) 117, the data section of the active BMC firmware image 106 containing the S-Boot 312 (e.g., the initial 64 KB) into the SRAM 124. The data of this section are encrypted with the private key A of a first public key/private key pair.

In procedure 412, the processing unit 112 validates the data section of the S-Boot 312. In particular, the OTP memory 122 of the processing unit 112 is programmed with the public key A of the first public key/private key pair. The processing unit 112 retrieves the public key A from the OTP memory 122, and uses the public key A to decrypt the data section of the S-Boot 312. As such, the decrypted data of the S-Boot 312 are stored in the SRAM 124. Further, in certain configurations, the processing unit 112 may calculate a Hash for the decrypted data of the S-Boot 312 and extract another Hash stored in the decrypted data. The processing unit 112 then compares the calculated Hash and the stored Hash to determine if the S-Boot 312 is valid.

When the data section containing the S-Boot 312 is not valid, the processing unit 112 enters procedure 450. When data of the S-Boot 312 is valid, the processing unit 112 executes the S-Boot 312. The S-Boot 312 initializes the memory 114 (e.g., a DRAM). Subsequently, in procedure 414, the S-Boot 312 loads the data section of the active BMC firmware image 106 containing the U-Boot 314 into the memory 114. In procedure 416, the S-Boot 312 then validates the data of the U-Boot 314. For example, similar to what was described supra, the processing unit 112 may use Hashes to validate the data section containing the U-Boot 314.

When the data section containing the U-Boot 314 is not valid, the S-Boot 312 enters procedure 450, in which the booting process is ended. When data section containing the U-Boot 314 is valid, the S-Boot 312 passes control to the U-Boot 314. That is, the processing unit 112 executes the U-Boot 314 and enters procedure 418.

In procedure 418, the U-Boot 314 then loads the remainder of the active BMC firmware image 106 (e.g., data sections of the NVRAM 316, the kernel 318, the rootfs 320, the applications 322, the platform specific data 324, etc.) into the memory 114. In certain configurations, the data sections of the kernel 318, the rootfs 320, the applications 322, and/or other components are encrypted by the private key B of a second public key/private key pair. Further, the platform specific data 324 contain the public key B of the second public key/private key pair.

In procedure 420, the U-Boot 314 validates those data sections of the active BMC firmware image 106. In particular, the U-Boot 314 retrieves the public key B from the platform specific data 324 and uses the public key B to decrypt the data sections containing the kernel 318, the rootfs 320, the applications 322, etc. Further, similar to what was described supra, the processing unit 112 may use Hashes to validate the data containing those components.

When the data sections of the kernel 318, the rootfs 320, the applications 322, and/or other components are not valid, the U-Boot 314 enters procedure 450. When those sections are valid, in procedure 422, the BMC OS 130 is booted up. In particular, the U-Boot 314 passes the control to the kernel 318. The kernel 318 then initializes the rootfs 320. The kernel 318 then mounts the NVRAM 316 (e.g., utilizing the SRAM 124). The NVRAM 316 may contain system configuration information, such as settings for the hardware and the BMC firmware. The applications 322 (e.g., the IPMI services 134, the system management component 136, and the application(s) 138) are then started.

In procedure 450, where the booting process using the active BMC firmware image 106 has failed, the processing unit 112 changes the image to be used in the booting process to the recovery BMC firmware 106', and enters in procedure 410 with the recovery BMC firmware 106' as an input. Further, the BMC OS 130 stops the timer 127-1.

When executing the procedures described supra with the recovery BMC firmware 106' (instead of the active BMC firmware image 106), in places where the processing unit 112 enters procedure 450 previously, the processing unit 112 enters procedure 450', in which the booting process is terminated.

When the timer is not stopped and expires (i.e., the booting process has failed), if the booting process is executed with the active BMC firmware image 106, the processing unit 112 enters procedure 450. if the booting process is executed with the recovery BMC firmware 106', the process ends.

When the BMC OS 130 (either loaded from the active BMC firmware image 106 or recovery BMC firmware 106') has been successfully booted, the processing unit 112, under the instructions of one of the application(s) 138, may validate the active initialization component image 191 stored on the storage device(s) 185. Similar to what was described supra, the data of the active initialization component image 191 may be encrypted by the private key A of the first public key/private key pair. Accordingly, the processing unit 112 retrieves the public key A from the OTP memory 122 and uses the public key A to decrypt the data. The processing unit 112 may further uses Hashes to validate the data of the active initialization component image 191.

When the data of the active initialization component image 191 are valid, the BMC 102 starts the timer 127-2 and the booting process of the host computer 180 with the active initialization component image 191 as an input. Accordingly, the host CPU 182 loads the active initialization component image 191 and executes the initialization component 192 from that image. Subsequently, the initialization component 192 initiates the booting process of the host computer 180. Further, the timer 127-2 is configured to expire after a second time period. The second time period is longer than a time period needed to boot up the host computer 180. For example, assuming the booting process needs 2 minutes to complete, the second time period may be 3 minutes.

When the data of the active initialization component image 191 are not valid, the BMC 102 does not use the active initialization component image 191 and, in turn, validates the data of the recovery initialization component image 191' stored on the storage device(s) 185. Similarly, the data of the recovery initialization component image 191' may be encrypted with the private key A. The processing unit 112 may use the first public key and Hashes to validate the data of the recovery initialization component image 191".

When the data of the recovery initialization component image 191' are valid, the BMC 102 starts the timer 127-2 and the booting process of the host computer 180 with the recovery initialization component image 191' as an input. Accordingly, the host CPU 182 loads the recovery initialization component image 191' and executes the initialization component 192 from that image. Subsequently, the initialization component 192 from the recovery initialization component image 191' initiates the booting process of the host computer 180. When the data of the recovery initialization component image 191' are not valid, the booting process of the host computer 180 terminates.

After the OS 194 has been successfully booted (either by the initialization component 192 from the active initialization component image 191 or the recovery initialization component image 191'), an application of the host computer 180 may set a corresponding GPIO value at the BMC 102 through the GPIO interface 123. For example, the corresponding GPIO value at default may be low, and the host computer 180 may set the value to high through the GPIO interface 123. When the corresponding GPIO value is set by the host computer 180, the processing unit 112, accordingly, turns off the timer 127-2.

When the timer is not stopped by the application of host computer 180 and expires (i.e., the booting process has failed), if the booting process of the host computer 180 is initiated by the initialization component 192 from the active initialization component image 191, the BMC 102 resets the booting process of the host computer 180 with the recovery initialization component image 191'. Subsequently, the BMC 102 validates the recovery initialization component image 191' as described supra and directs the host CPU 182 to executes the initialization component 192 from the recovery initialization component image 191' that has been validated. If the booting process of the host computer 180 is initiated by the initialization component 192 from the recovery initialization component image 191', the process ends.

Figure 5:
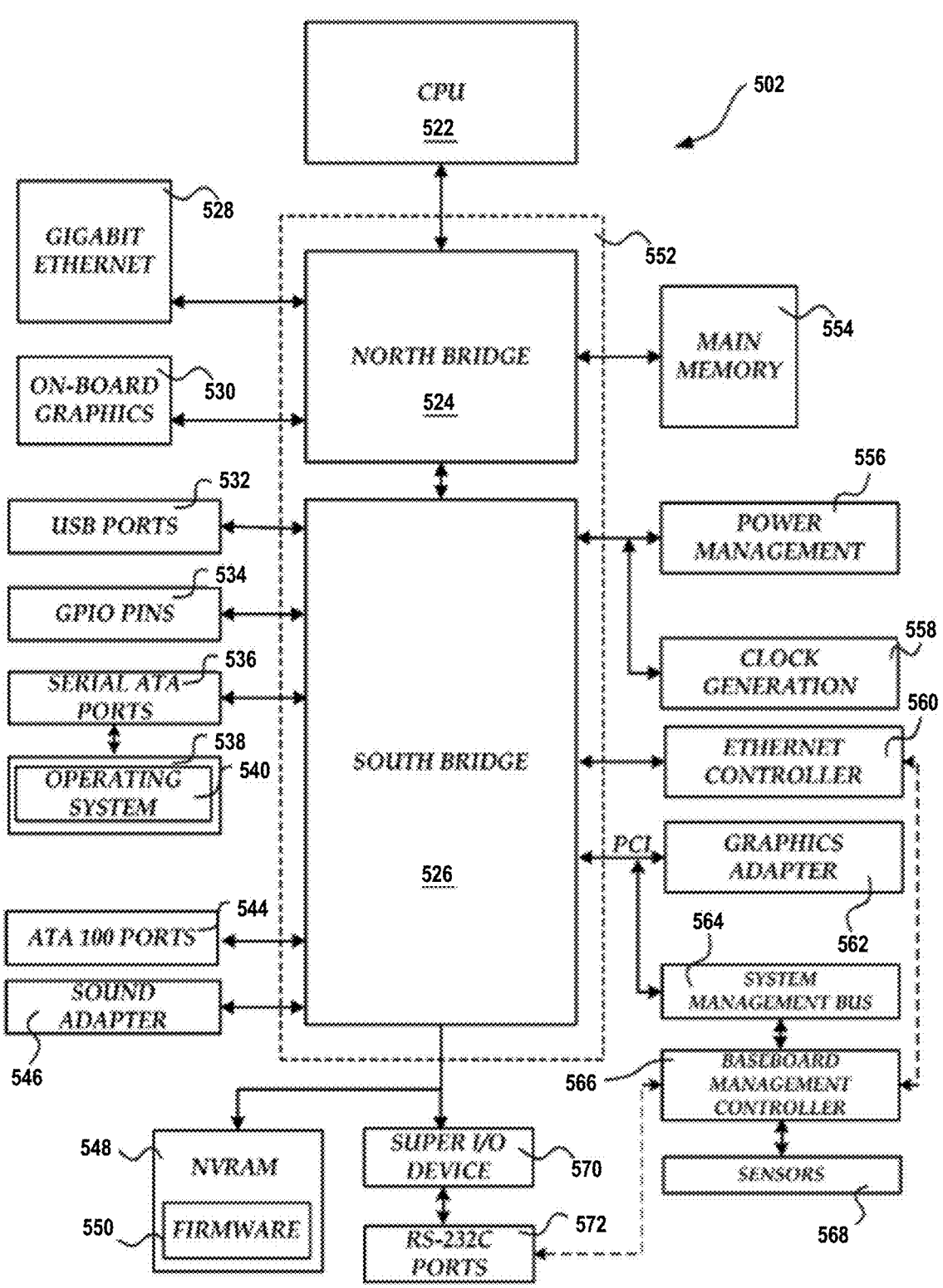
FIG. 5 shows an architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 180, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a key board port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including hand-held computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a baseboard management controller (BMC), comprising:
   validating, by a processing unit of the BMC, a first boot program from an active firmware image by loading at least a portion of the first boot program from the active firmware image into a static random access memory (SRAM) of the BMC;
   decrypting the loaded portion of the first boot program from the active firmware image using a public key that is (i) stored in a one-time programmable memory (OTP) integrated within the processing unit of the BMC, and (ii) retrieved by the processing unit from the OTP;
   calculating a first hash for the decrypted portion of the first boot program, extracting a second hash stored in the decrypted portion of the first boot program, and comparing the first hash and the second hash to determine if the first boot program from the active firmware image is valid;
   in response to determining that the first boot program of the active firmware image is not validated:
      (i) validating, by the processing unit of the BMC, a first boot program from a recovery firmware image by loading at least a portion of the first boot program from the recovery firmware image into the SRAM of the BMC;
      (ii) decrypting at least a portion of the first boot program from the recovery firmware image using the public key;
      (iii) calculating a third hash for the decrypted portion of the first boot program from the recovery firmware image, extracting a fourth hash stored in the decrypted portion of the first boot program from the recovery firmware image, and comparing the third hash and the fourth hash; and
      (iv) executing the first boot program from the recovery firmware image, in response to determining the first boot program from the recovery firmware image is validated.

2. The method of claim 1, further comprising:
   when the first boot program is being executed, loading, by the first boot program, a second boot program from the active firmware image; and
   executing the second boot program to boot firmware of the BMC.

3. The method of claim 2, further comprising:
   determining, based on a first timer at the BMC, that the firmware of the BMC is not booted within a first time period; and
   subsequently, starting another booting process at the BMC to load the recovery firmware image of the BMC.

4. The method of claim 2, further comprising:
   after the firmware of the BMC is booted, validating, at the BMC and based on a hardware component, an active initialization component image of a host; and
   when the active initialization component image is validated, directing the host to load the active initialization component image in order to boot an operating system (OS) of the host.

5. The method of claim 4, further comprising:
   validating a recovery initialization component image based on the hardware component, when the active initialization component image is not validated; and
   directing the host to load the recovery initialization component image in order to boot the OS of the host, when the recovery initialization component image is validated.

6. The method of claim 4, further comprising:
   determining, based on a second hardware timer at the BMC, that the OS of the host is not booted within a second time period; and
   subsequently, directing the host to start another booting process to load a recovery initialization component image of the host.

7. An apparatus, the apparatus being a baseboard management controller (BMC), comprising:

a memory; and at least one processor coupled to the memory and configured to:

validate, by a processing unit of the BMC, a first boot program from an active firmware image by loading at least a portion of the first boot program from the active firmware image into a static random access memory (SRAM) of the BMC;

decrypt the loaded portion of the first boot program from the active firmware image using a public key that is (i) stored in a one-time programmable memory (OTP) integrated within the processing unit of the BMC, and (ii) retrieved by the processing unit from the OTP;

calculate a first hash for the decrypted portion of the first boot program, extracting a second hash stored in the decrypted portion of the first boot program, and comparing the first hash and the second hash to determine if the first boot program from the active firmware image is valid;

in response to determining that the first boot program of the active firmware image is not validated:

(i) validate, by the processing unit of the BMC, a first boot program from a recovery firmware image by loading at least a portion of the first boot program from the recovery firmware image into the SRAM of the BMC;

(ii) decrypt at least a portion of the first boot program from the recovery firmware image using the public key; and (iii) calculate a third hash for the decrypted portion of the first boot program from the recovery firmware image, extracting a fourth hash stored in the decrypted portion of the first boot program from the recovery firmware image, and comparing the third hash and the fourth hash; and (iv) execute the first boot program from the recovery firmware image, in response to determining the first boot program from the recovery firmware image is validated.

8. The apparatus of claim 7, wherein the at least one processor is further configured to:

when the first boot program is being executed, load, by the first boot program, a second boot program from the active firmware image; and execute the second boot program to boot firmware of the BMC.

9. The apparatus of claim 8, wherein the at least one processor is further configured to:

determine, based on a first timer at the BMC, that the firmware of the BMC is not booted within a first time period; and subsequently, start another booting process at the BMC to load the recovery firmware image of the BMC.

10. The apparatus of claim 8, wherein the at least one processor is further configured to:

after the firmware of the BMC is booted, validate, at the BMC and based on a hardware component, an active initialization component image of a host; and when the active initialization component image is validated, direct the host to load the active initialization component image in order to boot an operating system (OS) of the host.

11. The apparatus of claim 10, wherein the at least one processor is further configured to:

validate a recovery initialization component image based on the hardware component, when the active initialization component image is not validated; and direct the host to load the recovery initialization component image in order to boot the OS of the host, when the recovery initialization component image is validated.

12. The apparatus of claim 10, wherein the at least one processor is further configured to:

determining, based on a second hardware timer at the BMC, that the OS of the host is not booted within a second time period; and subsequently, direct the host to start another booting process to load a recovery initialization component image of the host.

13. A non-transitory computer-readable medium storing computer executable code for operating a baseboard management controller (BMC), comprising code to:

validate, by a processing unit of the BMC, a first boot program from an active firmware image by loading at least a portion of the first boot program from the active firmware image into a static random access memory (SRAM) of the BMC;

decrypt the loaded portion of the first boot program from the active firmware image using a public key that is (i) stored in a one-time programmable memory (OTP) integrated within the processing unit of the BMC, and (ii) retrieved by the processing unit from the OTP;

calculate a first hash for the decrypted portion of the first boot program, extracting a second hash stored in the decrypted portion of the first boot program, and comparing the first hash and the second hash to determine if the first boot program from the active firmware image is valid;

in response to determining that the first boot program of the active firmware image is not validated:

(i) validate, by the processing unit of the BMC, a first boot program from a recovery firmware image by loading at least a portion of the first boot program from the recovery firmware image into the SRAM of the BMC;

(ii) decrypt at least a portion of the first boot program from the recovery firmware image using the public key;

(iii) calculate a third hash for the decrypted portion of the first boot program from the recovery firmware image, extracting a fourth hash stored in the decrypted portion of the first boot program from the recovery firmware image, and comparing the third hash and the fourth hash; and (iv) execute the first boot program from the recovery firmware image, in response to determining the first boot program from the recovery firmware image is validated.

14. The non-transitory computer-readable medium of claim 13, wherein the code is further configured to:

when the first boot program is being executed, load, by the first boot program, a second boot program from the active firmware image; and execute the second boot program to boot firmware of the BMC.

15. The non-transitory computer-readable medium of claim 14, wherein the code is further configured to:

determine, based on a first timer at the BMC, that the firmware of the BMC is not booted within a first time period; and subsequently, start another booting process at the BMC to load the recovery firmware image of the BMC.

16. The non-transitory computer-readable medium of claim 14, wherein the code is further configured to:

after the firmware of the BMC is booted, validate, at the BMC and based on a hardware component, an active initialization component image of a host; and when the active initialization component image is validated, direct the host to load the active initialization component image in order to boot an operating system (OS) of the host.

17. The non-transitory computer-readable medium of claim 16, wherein the code is further configured to:

validate a recovery initialization component image based on the hardware component, when the active initialization component image is not validated; and direct the host to load the recovery initialization component image in order to boot the OS of the host, when the recovery initialization component image is validated.

18. The non-transitory computer-readable medium of claim 16, wherein the code is further configured to:

determining, based on a second hardware timer at the BMC, that the OS of the host is not booted within a second time period; and subsequently, direct the host to start another booting process to load a recovery initialization component image of the host.

* * * * *